United States Patent [19]
Coulonvaux et al.

[11] Patent Number: 6,096,108
[45] Date of Patent: *Aug. 1, 2000

[54] AIR CLEANER MOUNTING ARRANGEMENT AND METHOD

[75] Inventors: Paul R. Coulonvaux, Brussels; Johan G. Dewit, Hamme-Mille, both of Belgium

[73] Assignee: Donaldson Company, Inc., Minneapolis, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/956,157

[22] Filed: Oct. 22, 1997

[51] Int. Cl.[7] .................................................. B01D 35/30
[52] U.S. Cl. ............................. 55/385.3; 55/480; 55/490; 55/493; 55/508
[58] Field of Search .................................. 55/385.3, 480, 55/508, 490, 493, 503, 504

[56] References Cited

U.S. PATENT DOCUMENTS

| | | |
|---|---|---|
| 2,085,155 | 6/1937 | Heldbrink ................................. 55/508 |
| 3,078,650 | 2/1963 | Anderson et al. . |
| 4,382,808 | 5/1983 | Van Wormer, Jr. et al. ............. 55/493 |
| 4,491,460 | 1/1985 | Tokar . |
| 4,720,292 | 1/1988 | Engel et al. . |
| 4,767,427 | 8/1988 | Barabas et al. ........................... 55/508 |
| 5,013,182 | 5/1991 | Coulvonvaux . |
| 5,545,241 | 8/1996 | Vanderauwera et al. . |
| 5,785,724 | 7/1998 | Johnson .................................... 55/508 |

FOREIGN PATENT DOCUMENTS

939129 12/1993 South Africa .

Primary Examiner—Jay H. Woo
Assistant Examiner—Minh-Chau T. Pham
Attorney, Agent, or Firm—Merchant & Gould P.C.

[57] ABSTRACT

A mounting arrangement for an air cleaner assembly is provided. The mounting arrangement includes a framework construction and a compressible pad arrangement. The framework construction is configured for mounting on the frame of a system to which the air cleaner assembly is to be mounted. The compressible pad arrangement is positioned to be compressed against the air cleaner assembly, by the framework construction, during use, to achieve desirable advantage. Also, a combination of a mounting arrangement and air cleaner assembly is provided, as well as methods of preparation and use.

7 Claims, 12 Drawing Sheets

AIR CLEANER MOUNTING ARRANGEMENT AND METHOD

FIELD OF THE INVENTION

The present invention relates to mounting arrangements for air cleaner assemblies. It particularly concerns preferred mounting arrangements for securing air cleaner housings in selected positions on vehicles such as trucks, agricultural equipment and off-road construction equipment. Methods for preparing such arrangements and methods of use are also provided.

BACKGROUND OF THE INVENTION

Air cleaner arrangements are utilized as part of the engine airtake system for a wide variety of equipment. In many instances, the equipment is mobile. For example, the equipment may be an over-the-highway truck, off-road construction equipment, agricultural equipment, or industrial specialty equipment such as forklifts. Often, the air cleaner assembly is mounted on portions of the frame of the equipment, or on exterior surfaces.

The air cleaner assembly is often subjected to severe vibrations, as the vehicle is operated and moved.

In many instances, the housing of the air cleaner is entirely metal, or has at least a metal cylindrical wall. An arrangement having a cylindrical wall and plastic ends is illustrated, for example, in U.S. Pat. No. 5,547,480, incorporated herein by reference. When an air cleaner assembly having a metal outer sidewall is used, it is often mounted by: brackets, secured to the housing by welding or similar connection, that include portions that can be secured to a vehicle frame or other surface.

When the housing has a plastic sidewall, it can be molded with features to facilitate mounting. For example, molded mounting brackets can be included as an integral part of the housing. Alternatively, separate band clamps or molded mounting brackets can be developed, which have portions for engagement with the housing. One of these latter types of arrangements is illustrated in U.S. Pat. No. 5,545,241, incorporated herein by reference.

In general, for more universal use, it is preferred that the mounting arrangement not comprise materials permanently secured to the housing, with respect to radial orientation. A reason for this is that, depending on the particular vehicle involved, the circular air cleaner housing may be rotated different amounts relative to the vehicle surface. This is typically done to facilitate such operations as: servicing of the enclosed element; attachment to various hoses, etc.; accessibility of latches or other features for operation; and, orientation of discharge valves or similar structures. If the manufacturer of the housing were to either mold the arrangement with permanent fixtures for attachment to the vehicle; or, were to weld such features to the housing, radial orientation would often be fixed, and manufacture convenience and assembly would not be as well served.

SUMMARY OF THE INVENTION

According to the present invention, a mounting arrangement for an air cleaner assembly is provided. The mounting arrangement generally comprises a framework construction. The framework construction for preferred embodiments comprises an arcuate band having an inner surface and first and second ends. For the preferred construction the arcuate band inner surface is plastic throughout its radial arc. The preferred framework construction further includes a first support arrangement constructed and arranged to support the first end of the arcuate band, and a second support arrangement constructed and arranged to support the second end of the arcuate band.

The preferred mounting arrangement also includes a compressible pad arrangement. It is positioned between the arcuate band inner surface and the air cleaner assembly, in use. It may be mounted on the arcuate band, or it may be a separate piece. The compressible pad arrangement is preferably constructed and arranged to be pressed against an air cleaner assembly, when the mounting arrangement is used to support such an assembly. That is, the compressible pad arrangement becomes compressed between the framework construction, i.e., the arcuate band, and the air cleaner housing, in use.

Preferably the entire framework construction (discounting mounting bolts) comprises a unitary, molded, plastic construction. It may include metal inserts for strength, but generally such inserts are not required. Preferably the first support arrangement comprises a base and first and second, spaced, support gussets. The spaced support gussets preferably project outwardly from the base, to engage and support portions of the band. Preferably the second support arrangement is analogously constructed, with respect to the second band end.

In a preferred embodiment, in which the framework construction is a unitary molded construction, preferably the arcuate band extends over a circular arc of about 320° to 360°, when the framework construction is viewed in side elevation, at rest for the "memory" of the material from which it is molded. That is, when the band is not twisted, spread or otherwise forced open or out of rest.

A variety of compressible pad arrangements are described. Preferably, when the pad arrangement is mounted on the framework construction it comprises at least one pad having a hardness, shore A, within a range of about 50 to 60. Preferably, under such circumstances if the pad arrangement comprises a plurality of pads, each pad has such a hardness. Also, preferably each pad is at least 3 mm (millimeters) thick. Preferably the construction is such that, when assembled, the pad arrangement will be under a compression of 40–60%.

In some preferred arrangements, the pad arrangement comprises a plurality of pads, each of which is positioned within an associated one of a plurality of recesses on the band inner surface. When such is the case, preferably the pads are sufficiently thick to project at least 2 mm out of an upper edge of the associated recesses.

In certain embodiments, the pad arrangement comprises a separate circular pad member, which is not secured to the frame construction. That is, the pad construction comprises a separate band. When such is the case, a somewhat softer construction, shore A about 40–55, may be preferred. In general with such embodiments a relatively thick pad, at least about 5 mm, will typically be preferred. Also, again, with such constructions generally materials and dimensions should be chosen such that the pad arrangement will be under compression of about 40–60%, during use.

The outer surfaces of the pad(s) may be flat, convex or concave, depending on the particular geometric configuration preferred. A preferred "wave" construction is shown in certain figures.

In one alternate embodiment, a plurality of generally rectangular (in plan view), pads are used, each spaced radially along the arcuate extension of the pad, and oriented with a longest dimension extending generally transversely across the band. Preferably, when such an arrangement is used, each pad is sufficiently long to extend at least about 70% to 95%, transversely, across the band. Preferably each pad in this latter referenced arrangement, is oriented in a recessed slot which intersects one edge of the band.

Also according to the present invention, a combination comprising a mounting arrangement, as described, and an air cleaner, is provided. The combination generally comprises a positioning of the mounting arrangement such that the band extends circumferentially around a housing of the air cleaner assembly. Mounting band arrangements can be used, in this manner, to secure even relatively heavy air cleaners, for example weighing about 10 to 15 kilograms (prior to dust loading and 17–25 kilograms after dust loading), and having diameters of about 25 to 40 cm to vehicles.

Also according to the present invention, some methods of construction and methods of use are provided.

DETAILED DESCRIPTION

I. A Potential Problem with Many Air Cleaner Mounting Constructions

Many air cleaner mounting constructions are subject to a potential problem, relating to the rigidity of the system. In particular, the mounting constructions are sometimes designed such that there is relatively little flexibility or "give" among the various joints or connections between the housing sidewall, and the portion of the vehicle on which the air cleaner is mounted. That is, the brackets or clamps that are secured to the air cleaner housing are sometimes secured in a relatively rigid manner; and, the mounting connection between the brackets or clamps and the vehicle framework or surface is also often an engagement without significant flexibility. This can sometimes cause problems.

For example, vehicles can vibrate substantially in use. Rigid connections can directly translate the vibration, without significant dampening, through the clamping arrangement directly to the housing. This can place undesirable stress on the housing or components therein, as a result.

In addition, air cleaner assemblies, when mounted, generally need to be aligned with appropriate connections, tubes or ducts, for proper installation. Difficulties can arise in obtaining and retaining appropriate alignment, if completely rigid systems with little flexibility and parts that must be precisely aligned, are utilized.

II. Improved Air Cleaner Mounting Constructions

Improved air cleaner mounting constructions according to the present invention are generally characterized by including:

1. A framework construction; and,
2. A compressible pad arrangement oriented to be positioned between the framework construction and the air cleaner housing, during use.

In general, improved air cleaner mounting constructions according to the present invention operate by utilizing a framework construction to engage one or more compressible mounting pads against an outer surface of an air cleaner construction. The compressible pad(s) can provide for some vibration absorption or dampening, reducing transmission of vibrational energy through the rigid mounting construction to the housing. In addition, or alternatively, the compressible pad(s) provide for friction engagement with the outer housing sidewall, when the framework construction is appropriately mounted. Thus, rotational orientation of the air cleaner housing relative to the mounting construction can be adjusted as selected and needed; and, separate attachments to the housing, for mounting purposes, are generally not required.

A variety of materials can be used for the framework construction. However, for the preferred arrangements illustrated herein, the framework construction comprises a rigid molded plastic construction, typically a one-piece, or unitary, construction prepared from a plastic such as a conventional glass-filled polypropylene plastic. A usable such plastic is 30% glass-filled polypropylene, commercially available from Hoechst under the mark Hostacom® G3 N01; or under the designation Latene AG3 UVH G/30 from Lati Industria Thermoplastici S.p.A., Vedano Olona, Italy.

The material utilized for the compressible pad arrangement may be varied. In general, it is foreseen that polymeric materials having a hardness, shore A, on the order of about 50 to 60 will be preferred, when the pad(s) are attached to the rigid molded frame construction. A variety of rubbers or elastomers are useable. Commercially available materials which can be molded to such a compressible pad construction include: Santoprene®, from Monsanto. If the pad(s) is a separate component from the rigid molded frame construction, a somewhat softer arrangement (40–55 shore A) may be desired. Similar materials can be used for this.

A variety of alternative arrangements are described herein, for positioning and/or securing the compressible pad arrangement within the framework construction. In general, the following types of arrangements are shown:

1. A mere positioning of the compressible pad arrangement in place, without any other method of securing to the framework construction, but rather reliance on the compression to maintain the pad arrangement in place. In one version of this, the pad arrangement is a separate band which is mounted onto the air cleaner before the rigid frame construction is applied thereto;
2. Use of a mechanical engagement between the compressible pad arrangement and the framework construction;
3. Use of adhesive;
4. Use of co-molding techniques.

These variations will be generally described hereinbelow. Of course, in some instances, combinations of these techniques can be used.

A variety of alternate geometric configurations are presented for the compressible pad arrangement as examples of the wide variety of manners in which techniques according to the present invention can be applied. The various arrangements present alternatives with respect to orientation of the compressible pad member(s) relative to the framework construction and/or the air cleaner housing sidewall. The different arrangements shown can be utilized to achieve selected and preferred variations in: vibration dampening effects; engagement with housings having a variety of features on an external surface thereof; and, assembly techniques. These will be apparent from the more detailed descriptions, and the various versions shown in the drawings.

Herein, one of the arrangements is depicted in association with an air cleaner housing having a metal sidewall. Arrangements according to the present invention are particularly well suited for such applications, especially when the housing sidewall comprises blank steel. Such air cleaner systems, including filter elements operably contained therein, typically weigh (not loaded with dust) from 10 to 15 kilograms, have metal sidewalls about 1.25 to 1.50 mm thick, and have outside diameters on the order of about 25 to 40 cm. From this, it should be apparent that arrangements according to the present invention can be sized and configured to conveniently handle even relatively large, heavy air cleaner housings. Of course, they can also be configured for utilization with smaller arrangements, but it is an advantage of certain preferred arrangements according to the present invention that they comprise materials which can be readily utilized for the large, heavy, arrangements referenced.

A first arrangement according to the present invention is generally depicted in FIGS. 1–5.

Figure 1:
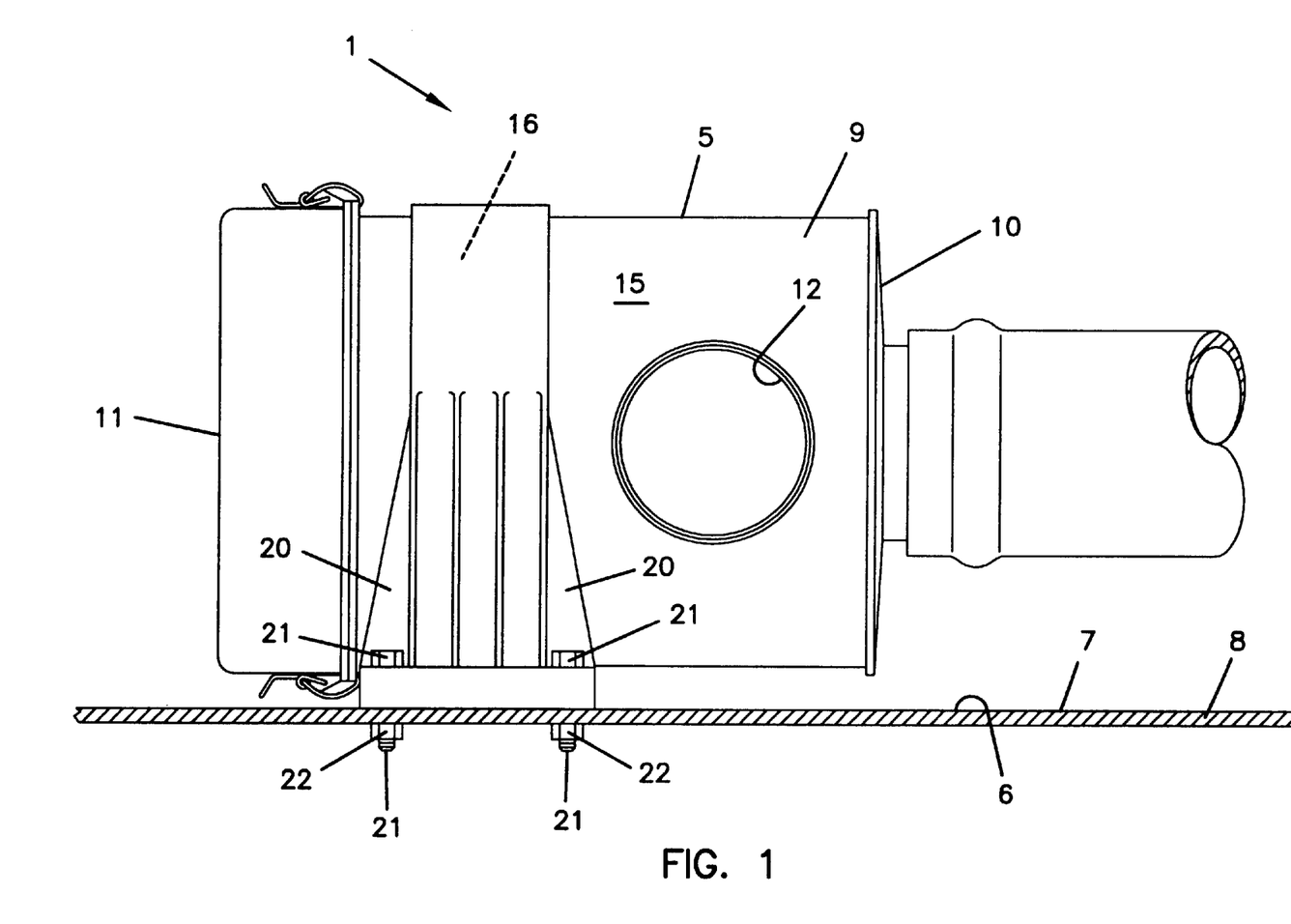
FIG. 1 is a side elevational view of an air cleaner mounting construction according to the present invention depicted in association with an air cleaner housing and mounted onto a portion of a vehicle, shown in fragmentary cross-section.

Referring to FIG. 1, reference numeral 1 generally depicts a mounting arrangement according to the present invention. The mounting arrangement 1 is depicted in FIG. 1 as generally securing an air cleaner assembly 5 to framework 6. Framework 6 would typically be either the exterior surface of a vehicle, or some internal frame member thereof. In FIG. 1, it is a portion 7 of an exterior metal surface of a truck 8.

The air cleaner assembly 5 depicted is generally of the type described in U.S. Pat. No. 5,547,480, the complete disclosure of which is incorporated herein by reference. The particular assembly 5 depicted is for illustrative purposes only, and the air cleaner assembly may be varied greatly from the one depicted. Air cleaner assembly 5 generally includes metal sidewall 9, a first plastic end cover 10, and a second plastic end cover 11. The second cover 11 is generally removable from sidewall 9, for access to an interior received filter element, not shown. The first plastic end cover 10 is generally more permanently secured to the sidewall 9, and comprises the end through which filtered air passes, in direction toward the vehicle air intake. Air to be filtered generally enters the housing sidewall 9 through inlet 12.

Generally, sidewall 9 is a smooth, cylindrical, metal sidewall preferably having no interfering, projecting surface features thereon in the region engaged by mounting arrangement 1. That is, it is generally smooth in this region 15 throughout its outer circumference. For typical systems, metal sidewall 9 will generally comprise blank steel having an outer surface 16 with a surface finish of a polyurethane-based powder coated paint.

Attention is now directed to mounting arrangement 1, FIG. 1. The mounting arrangement 1 includes framework member 20 secured to the vehicle framework 6 by bolts 21 and nuts 22. As will be understood from further descriptions, bolts 21 and nuts 22, when tightened, also provide for a secure clamping of air cleaner assembly 5 within the mounting arrangement 1, and thus inhibition of undesirable movement of the air cleaner assembly.

Figure 2:
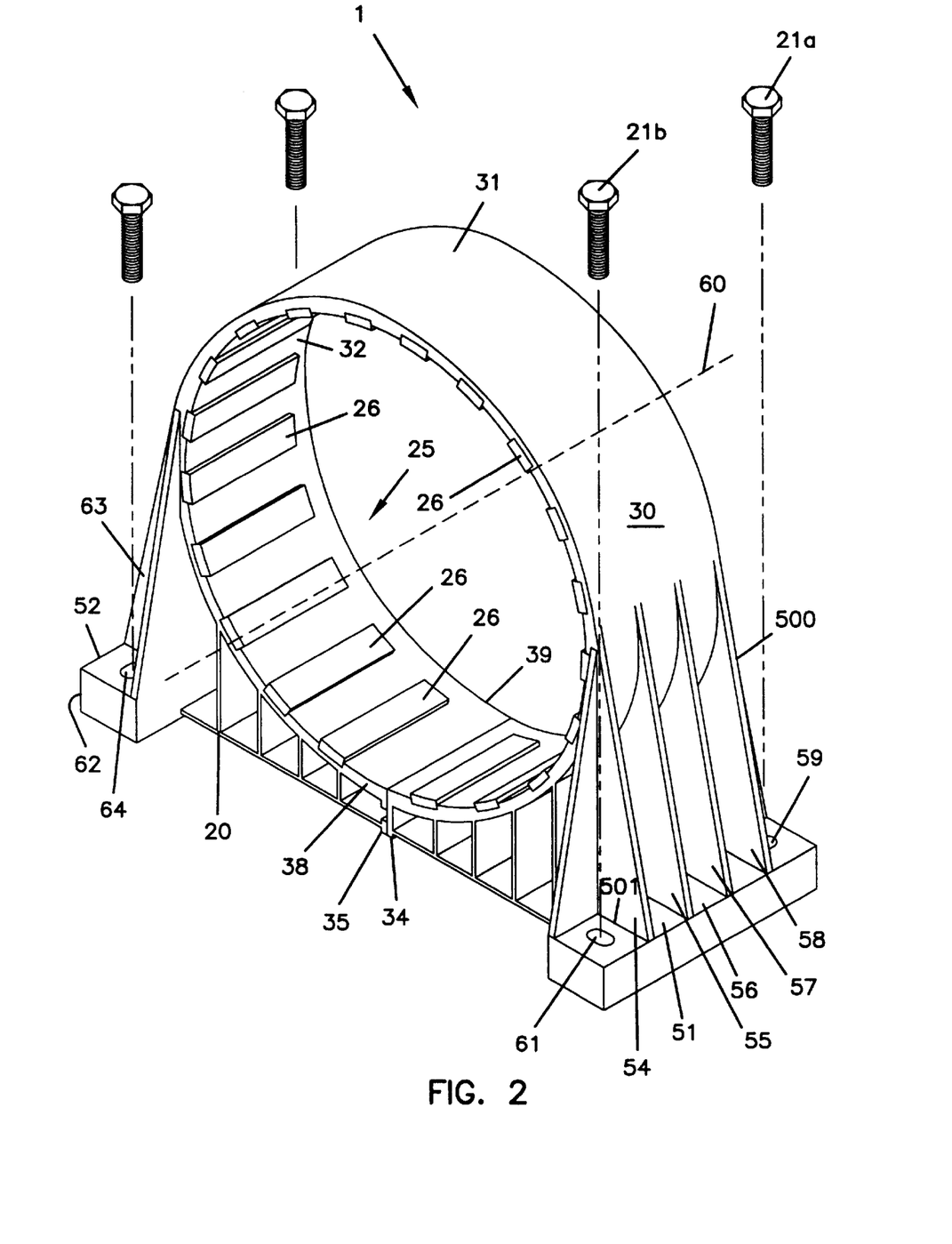
FIG. 2 is a perspective view of a mounting construction of the type depicted in FIG. 1.
Figure 3:
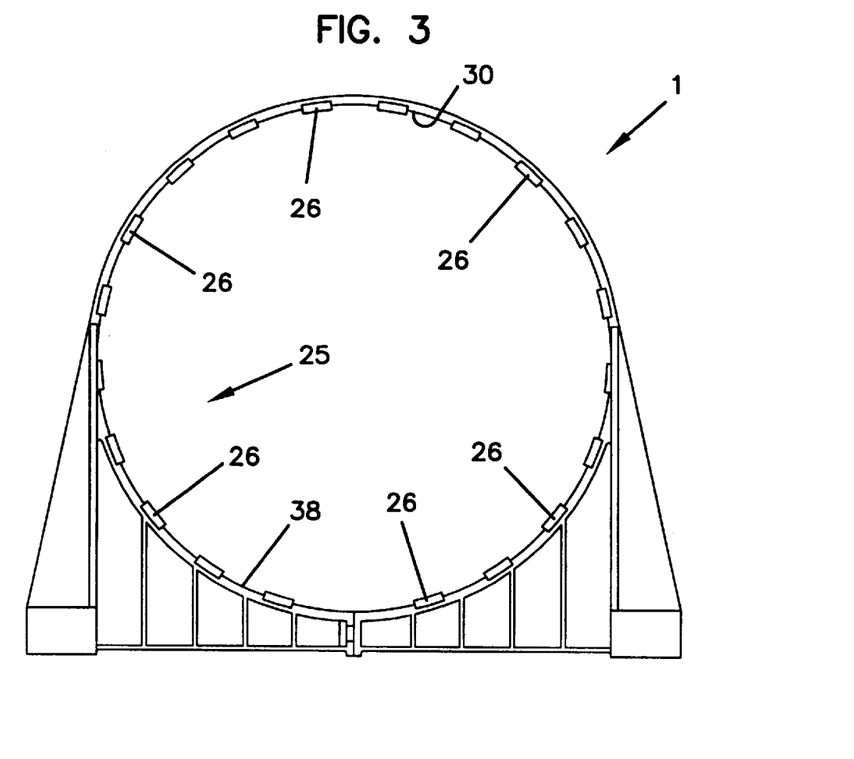
FIG. 3 is a side elevational view of the arrangement depicted in FIG. 2.

Attention is now directed to FIG. 2, which depicts mounting arrangement 1 in perspective. Mounting arrangement 1 generally comprises framework 20 and compressible pad arrangement 25. The compressible pad arrangement 25 for the particular embodiment shown generally comprises a plurality of spaced pads 26 oriented such that, in use, the pads 26 are spaced for engagement along outer surface 15 of sidewall 9 in region 16, FIG. 1.

In some systems, as an alternative, the pad arrangement 25 could comprise a single pad. Also, as will be apparent from further descriptions hereinbelow, a variety of compressible pad arrangements can be utilized.

Referring again to FIG. 2, framework 20 generally includes a central arcuate support band 30 having outer surface 31 and inner surface 32. For the particular arrangement shown, the support band 30 has a transverse opening therein, defined by ends 34 and 35. The term "transverse opening" when used in this context, refers to an opening or space 36 (FIG. 15) which extends completely, transversely, across support band 30, the transverse direction in this instance being a direction generally extending between side edges 38 and 39. The transverse space thus defines central support band 30 as an arc extending between first end 34 and second end 35. In many typical arrangements, as seen in the perspective view of FIG. 15, the arcuate extension of central support band 30 will be at least 300°, and typically 320–360°, measured when band 30 is at its "rest" or "memory" position, i.e., when it is neither strained open nor twisted and compressed, but rather is in the position of rest or elastic memory for the material from which it is formed. For typical arrangements, the band 30 will be about 90–200 mm wide, more typically 95–140 mm wide. As will be explained in more detail below, the transverse opening 36 may be closed with a clip arrangement so that ends 34, 35 abut.

Referring again to FIG. 2, framework 20 further includes first and second support arrangements 51 and 52. Support arrangement 51 is constructed and arranged for the following operations: to securely support end 34 of support band 30 in position; to, in cooperation with support arrangement 52, securely support an air cleaner arrangement in use; and, to anchor end 34 of support band 30 to a vehicle frame or other structure. Support arrangement 52 provides a similar function, in connection with end 35 of support band 30.

Referring to FIG. 2, support arrangement 51 includes a base member 56; and, first, second, third, and fourth spaced gussets 54, 55, 57, 58. Gussets 54, 55, 57, 58 project between base 56 and support band 30 for support of the band 30.

Base member 56 includes first and second mounting slots 59, 61 therein. First mounting slot 59 extends laterally in a direction generally parallel to a central longitudinal axis 60 of support band 30, i.e., in a general direction transverse to the band 30. In use, bolt 21a, for securing framework 20 to a portion of a vehicle or other assembly, is projected through first slot 59. As a result of the first slot 59, the orientation and position of framework 20 can be adjusted somewhat, before tightening of the bolt 21a occurs.

Second mounting slot 61 extends in a direction generally transverse to central longitudinal axis 60 of support band 30, i.e., in a general direction parallel to the band 30. Second slot 61 extends in a general direction which is generally transverse to the direction of first slot 59. In use, bolt 21b, for securing framework 20 to a portion of a vehicle or other assembly, is projected through second slot 61. Due at least in part to the different orientations of first slot 59 and second slot 61, the orientation and position of framework 20 can be adjusted somewhat before tightening of the bolts.

Support arrangement 52 is generally analogous to arrangement 51, except mounted to support end 35 of support band 30, and oriented as a mirror image of arrangement 51. Support arrangement 52, then, comprises base member 62, first, second, third and fourth side gussets 63, and slot 64. Slot 64 is analogous to slot 59. It is noted that slot 64 is oriented with its longitudinal direction generally orthogonal or perpendicular to slot 61, and parallel to slot 59. This allows for a number of degrees of motion, in securing support band 30 tightly around an air cleaner, in use, and also allows for some angular adjustment of support band 30, relative to a vehicle frame to which it is secured. Support arrangement 52 also includes a second slot (not shown) which is generally analogous to second mounting slot 61 of base 56. The second slot of support arrangement 52 is oriented with its longitudinal direction generally parallel to slot 61, and orthogonal or perpendicular to slot 59. This also allows for adjusting the support band 30 prior to securing the bolts within the slots. Of course, base 52 may include other slots, not shown.

Attention is now directed to inner surface 32 of support band 30. Inner surface 32 includes a compressible pad arrangement 25 thereon. The particular compressible pad arrangement 25 depicted comprises a plurality of longitudinal, somewhat rectangular (in top plan view), pads 26 oriented with a longer dimension of each pad 26 generally parallel central longitudinal axis 60 of the support band 30, i.e., to extend transversely. The pads 26 for the arrangement shown in FIG. 2, do not extend completely transversely across band 30, but rather begin at one edge 38 and extend at least about 70% and preferably 80–95% across toward edge 39.

Figures 4, 5:
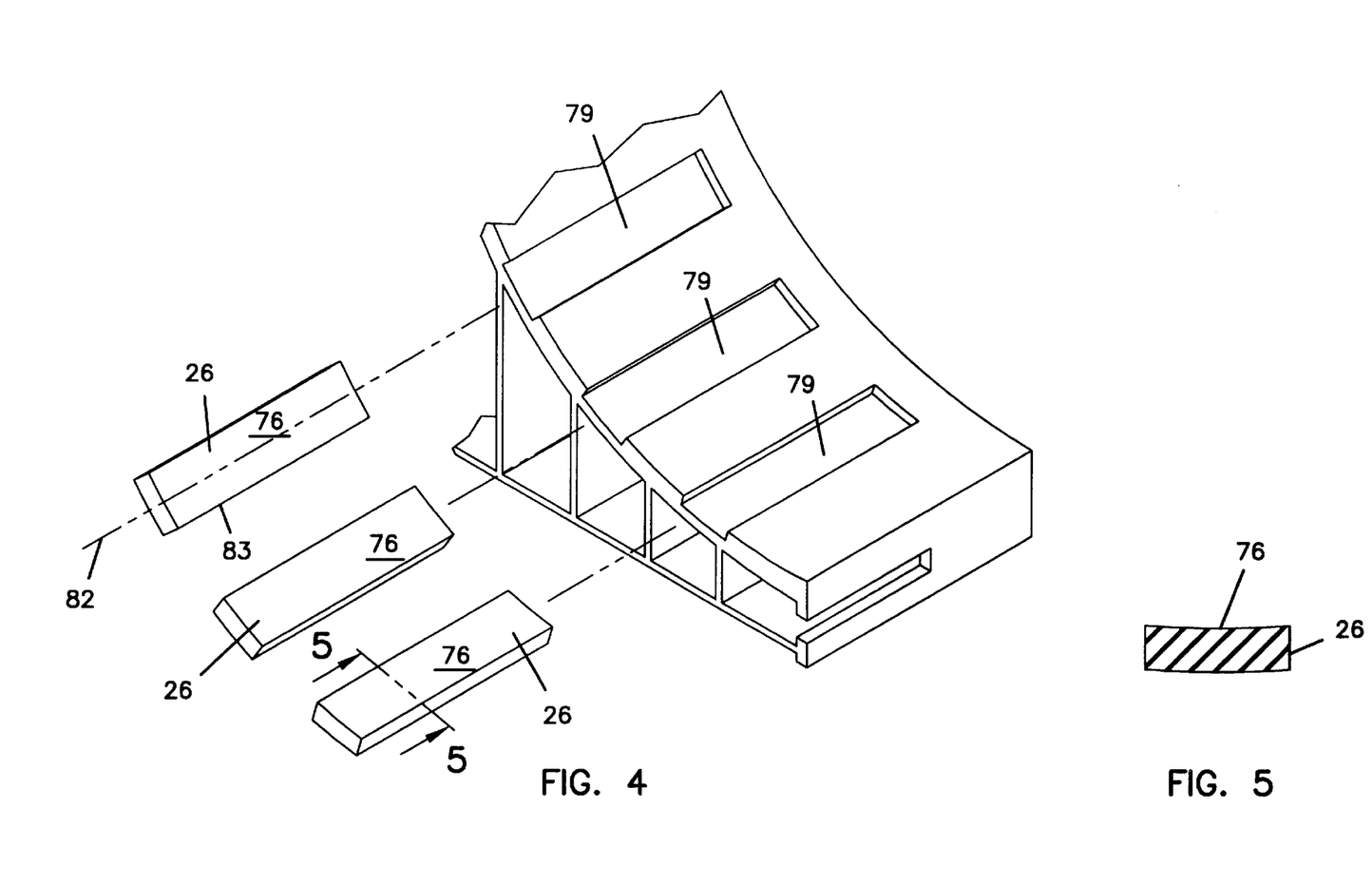
FIG. 4 is an enlarged, fragmentary, exploded perspective view of a portion of the arrangement shown in FIGS. 2 and 3.
FIG. 5 is a cross-sectional view of a portion of the arrangement, taken along line 5—5, FIG. 4.

The framework 20 includes a plurality of recessed slots 79 therein, depicted in exploded perspective view in FIG. 4. A pad 26 is positioned in each recessed slot 79. Preferably the depth of the slots 79 and the thickness of the pads 26 are chosen such that the pads project sufficiently outwardly from the slots 79 that, even under compression in use, the air cleaner 5 is engaged by outer surfaces 76 of the pads 26, rather than the inner surface 32 of the support band 30. In some arrangements, it may be desirable to mold pads 26 with curved outer surfaces 76, either convex or concave, to facilitate engagement with a housing outer surface. The pads 26 in FIGS. 1–4, shown in cross-section in FIG. 5, have an outer surface 76 which is concave, to match a curvature of surface 15, FIG. 1.

Typically, if the pads 26 are made of a compressible elastomeric material having a hardness, shore A, of about 50 to 60; and, the recessed slots 79 are on the order of about 1.5 to 2.5 mm deep, pads 26 having a thickness generally of about 1.5 to 3.0 mm greater than the depth of the slots 79, will be preferred; with dimensions chosen such that pad compression is about 50% (40–60%). Some specific preferred arrangements are discussed hereinbelow.

For the particular arrangement illustrated in FIGS. 1–4, the compressible pad arrangement 25 comprises 20 pads spaced, on center, about 15–20° apart. By "on center" in this context, reference is meant to a center line through the width of each pad 26, for example, center line 82 for pad 83, FIG. 4.

In some arrangements, it may be desirable to position the pads 26 within the framework 20 without securing, but rather with reliance upon compression against the housing 5, during use, to maintain the pads 26 in place. However, it is foreseen that when a plurality of pads such as used in the arrangement of FIGS. 1–4 are used, in general it will be preferred to secure the pads 26 in position, to facilitate assembly.

A variety of arrangements can be used for securing the pads 26 in the support band 30. One such arrangement is through utilization of an adhesive. That is, in a typical embodiment in which the framework 20 is molded from a hard plastic (ball indentation hardness, 30 sec. value, of 110 N/mm$^2$), and pads 26 are molded from a compressible polymeric material (with separate molding processes for the framework 20 and the pads 26), the pads 26 will be positioned within the recessed slots 79 and will be secured thereto by adhesive.

Figure 8:
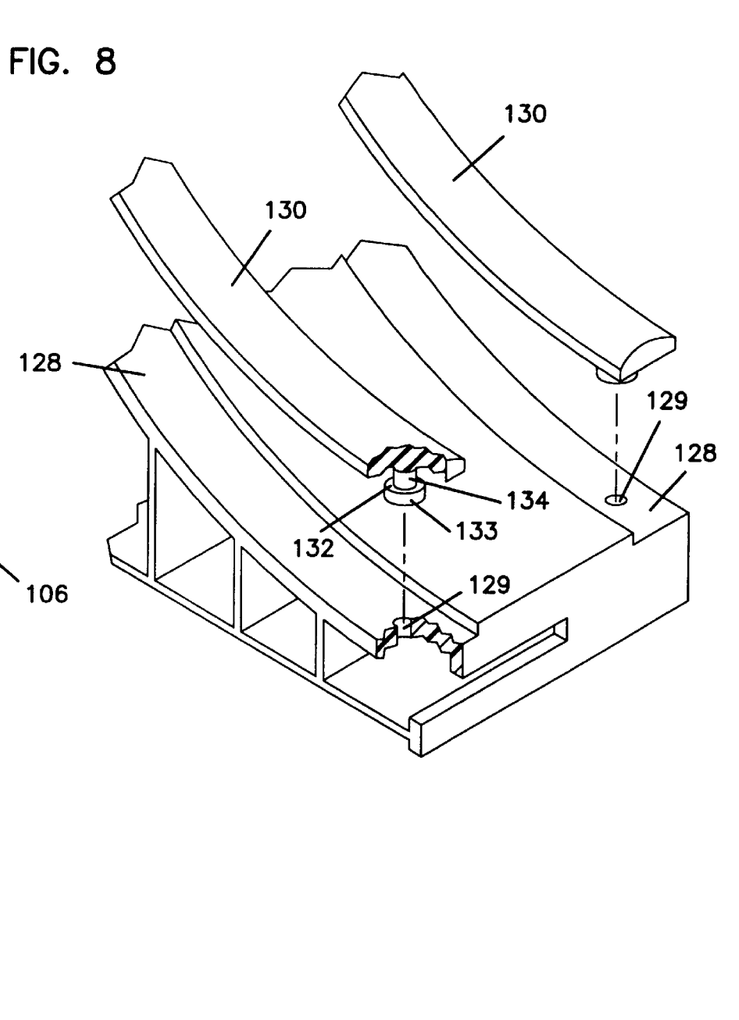
FIG. 8 is an exploded perspective view of an alternate mounting analogous to FIG. 7.

Alternate methods of securing are possible. One such alternate approach, is through utilization of a mechanical connection, for example an interference or friction fit between a portion of the pad, and a portion of the framework 20. Attention is directed to FIG. 8, discussed below in connection with an alternate embodiment, with respect to this.

Figure 6:
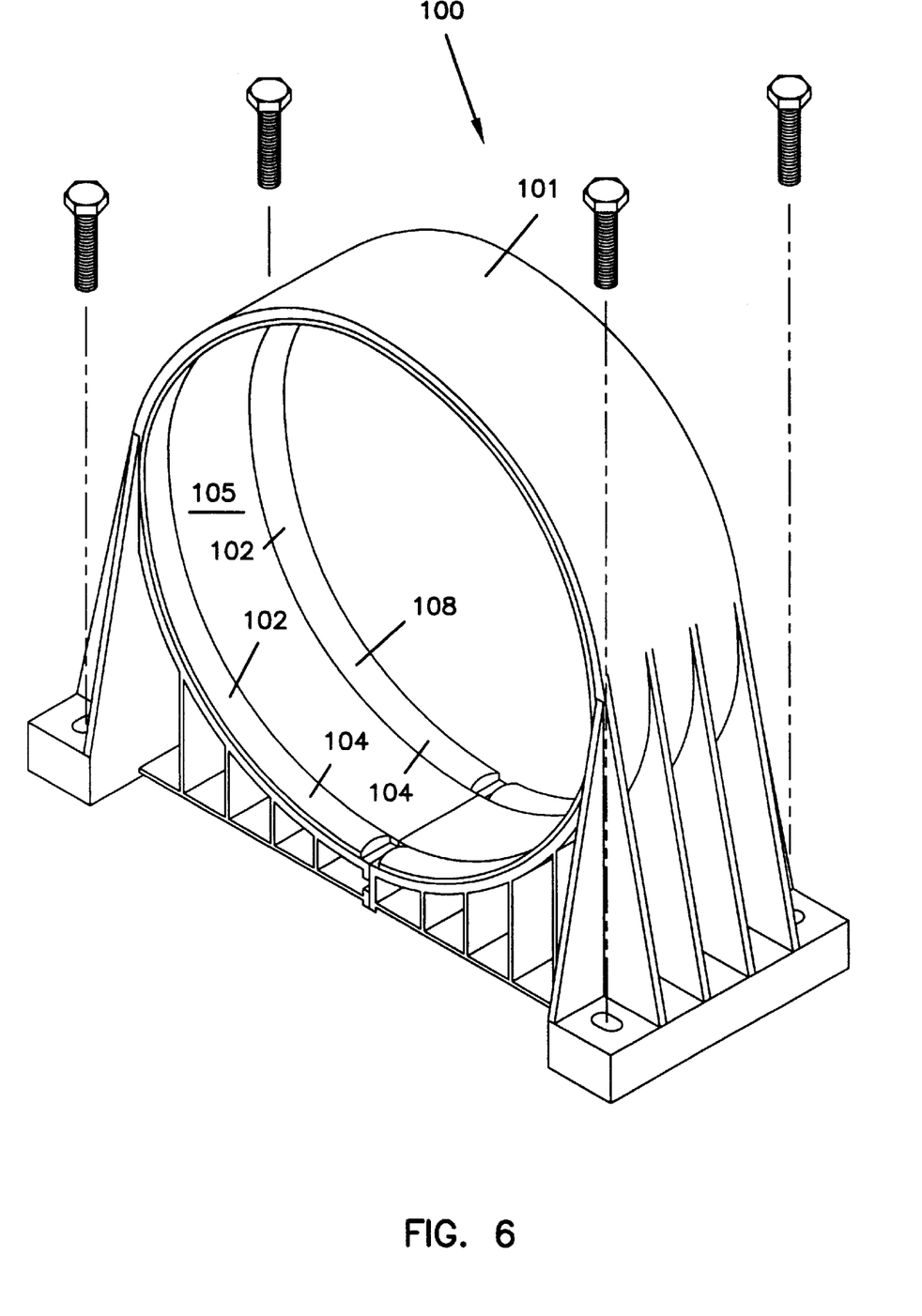
FIG. 6 is a perspective view of a first alternate embodiment.
Figure 7:
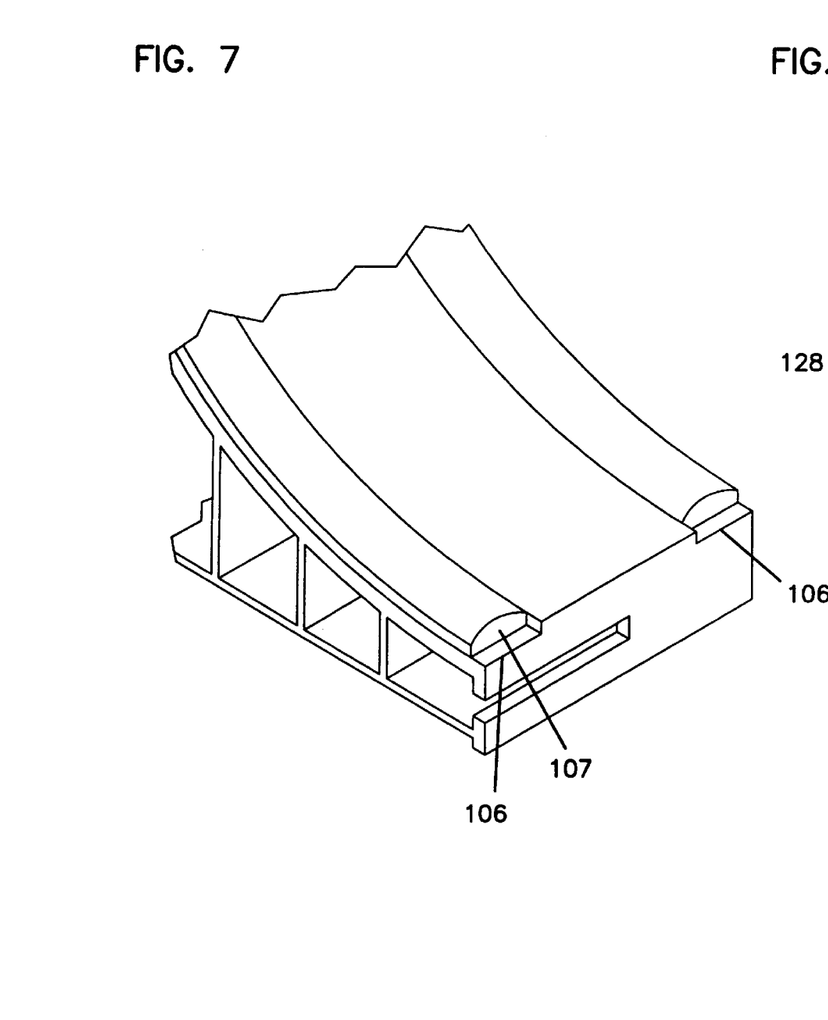
FIG. 7 is an enlarged fragmentary, perspective view of the arrangement shown in FIG. 6.

In FIG. 6, a perspective view of an alternate mounting arrangement is indicated at 100. Arrangement 100 depicts a part of mounting band 101 and compressible pad arrangement 102. The compressible pad arrangement depicted comprises extensions 104 of soft compressible material, which extend in an arcuate configuration along inner surface 105 of band 101. Receiving slots 106 (FIG. 7) are oriented to receive the extensions 104. For the particular arrangement depicted in FIG. 6, the mounting arrangement 100 includes two pads or extensions 104 oriented generally parallel to one another and each extending along an arcuate path. The pads 104 can be secured to the band 101 using any of the various techniques described herein. For example, an adhesive may be used.

Still referring to FIG. 6, pads 104 each have a cross-section with a flat bottom (or outer) surface 107 and a convex top (or inner) surface 108. This is viewable in the enlarged view of FIG. 7. It is foreseen that alternate configurations are usable.

Referring to FIG. 8, for the embodiment shown, each recessed slot 128 is positioned analogously to recessed slot 106 in band 101. A difference is that each recessed slot 128 includes at least one central hole 129 therein. Pads for use in association with recessed slots 129 are generally shown at 130. Each pad 130 is molded with a projection 132 on a bottom side thereof, appropriately sized to be pressed into hole 129. Projection 132 is compressible, and includes a head 133 positioned on post 134. If appropriately sized and configured, then, when pad 130 is pressed into recessed slot 128, projection 132 is pressed into hole 129. Once it extends through hole 129, the head 133 will expand, and thus resist removal; i.e., the arrangement is an interference fit. Of course, with such an arrangement, if enough force is applied to the pads 130, they can be removed. However, such an interference fit arrangement will be sufficient to retain the pads 130 in place, under ordinary use conditions.

In general, when the pads 130 are molded from a soft, compressible material such as an Santoprene® having a hardness shore A of about 50 to 60, it is foreseen that a head 133 diameter of about 10 mm, and a stem 132 diameter of about 5 mm will be operable and preferred when the narrowest portion of the hole 129 has a diameter of about 6 mm, i.e., slightly larger than the outside diameter of the stem 132.

A further method of providing the compressible pad arrangement and a framework 20, is through a co-molding process. With such a process, the overall mounting arrangement is manufactured using molding techniques such that the pads (26, 130) are positioned in the band while the band is being molded, so that the pads are secured in place during that process. In general, it is presently believed that Santoprene® pads (i.e., pads of thermoplastic rubber) will be usable in a co-molded process.

Figure 10:
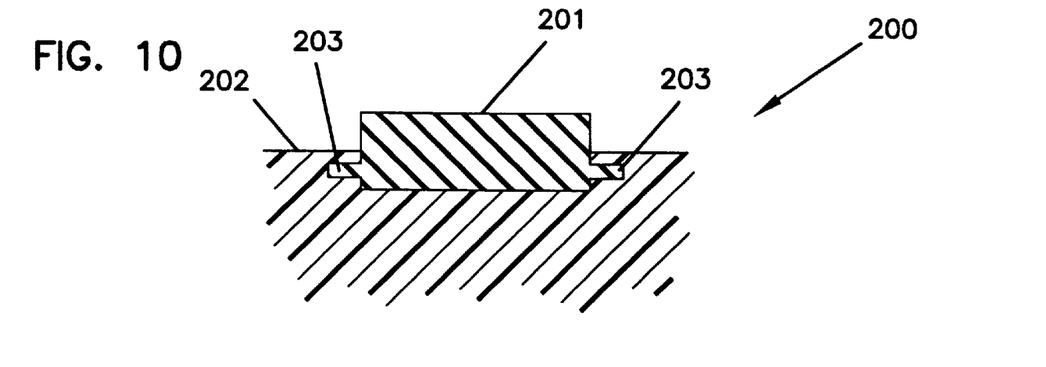
FIG. 10 is a fragmentary cross-sectional view of an alternate embodiment taken generally from a view analogous to that of line 10—10, FIG. 9.

Of course to facilitate secure engagement and avoid separation after molding, the pads may be molded with fingers or projections thereon which will be engulfed within the molded polymer of the framework, during molding. This is illustrated in FIG. 10. Referring to FIG. 10, a fragmentary cross-sectional view of a co-molded arrangement is shown. The arrangement 200 includes a pad 201 co-molded and secured to band 202. The pad 200 includes projections 203 thereon, which are surrounded by or embedded within the polymeric material of band 202, as a result of the co-molding process. This facilitates secure engagement, and causes resistance to separation.

Figure 9:
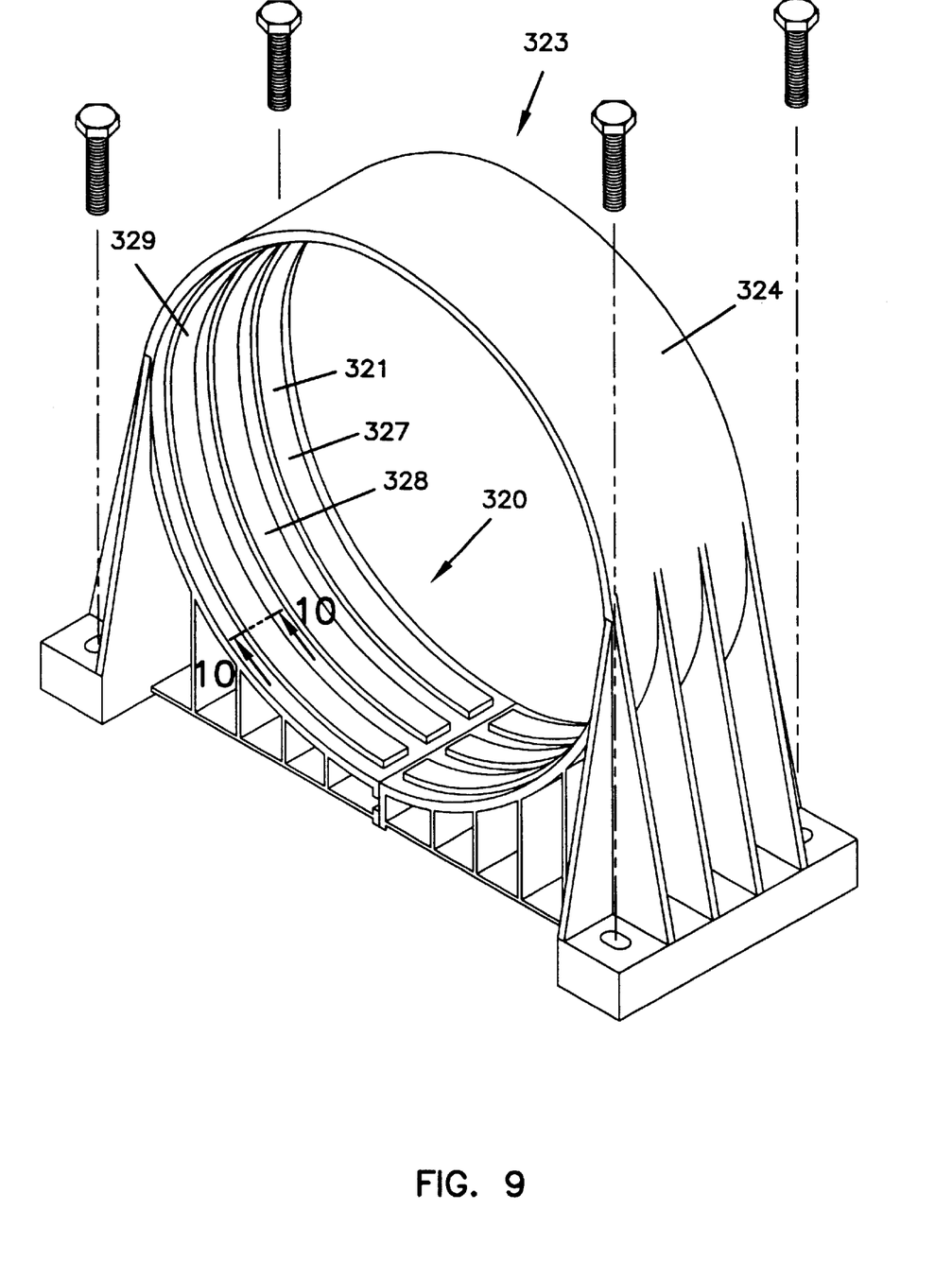
FIG. 9 is a perspective view of a third alternate construction according to the present invention.

The arrangement of FIG. 9 is generally analogous to that shown in FIG. 6, except it utilizes an alternate configuration for the pad arrangement. In particular, the arrangement of FIG. 9 utilizes a pad arrangement 320 in which individual pads or extensions 321 have a generally rectangular cross-section and, three pads 321 are used. Referring to FIG. 9, a perspective view is shown indicating a mounting arrangement 323 comprising a mounting band 324 and pad arrangement 320. The pad arrangement 320 comprises extensions 327, 328 and 329 which are generally analogous to one another in configuration.

Figure 11:
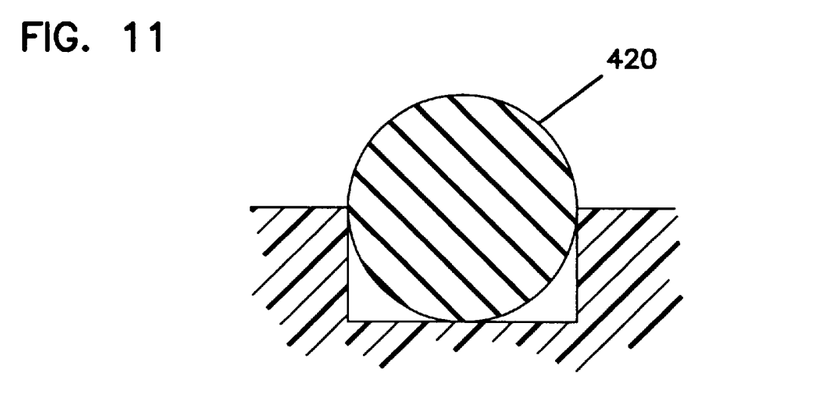
FIG. 11 is a cross-sectional view of a further alternate arrangement taken from a point of view generally analogous to that of line 10—10, FIG. 9.
Figure 12:
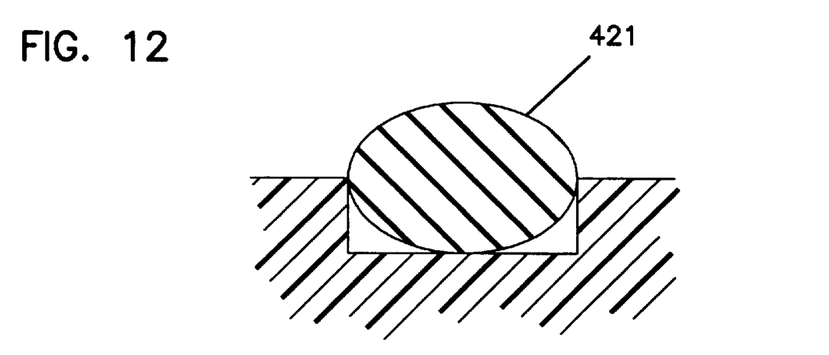
FIG. 12 is a cross-sectional view of a further alternate embodiment, from a viewpoint analogous to that of FIGS. 10 and 11.

In FIGS. 11 and 12, alternate cross-sections of pad arrangements is shown. FIG. 11 is a view taken generally analogously to the cross-section line reflected at 10—10, FIG. 9. In FIG. 11, a pad 420 having a circular cross-section is depicted. It could be used as an alternate to the somewhat rectangular cross-section shown in FIG. 9.

In FIG. 12, an oval cross-section that might be utilized in the arrangement of FIG. 9, is shown. In FIG. 12, it can be readily seen that the pad 421 has a generally oval cross-section.

Of course, alternate pad cross-sections could be used for the arrangements of FIGS. 2 and 6.

Figure 13:
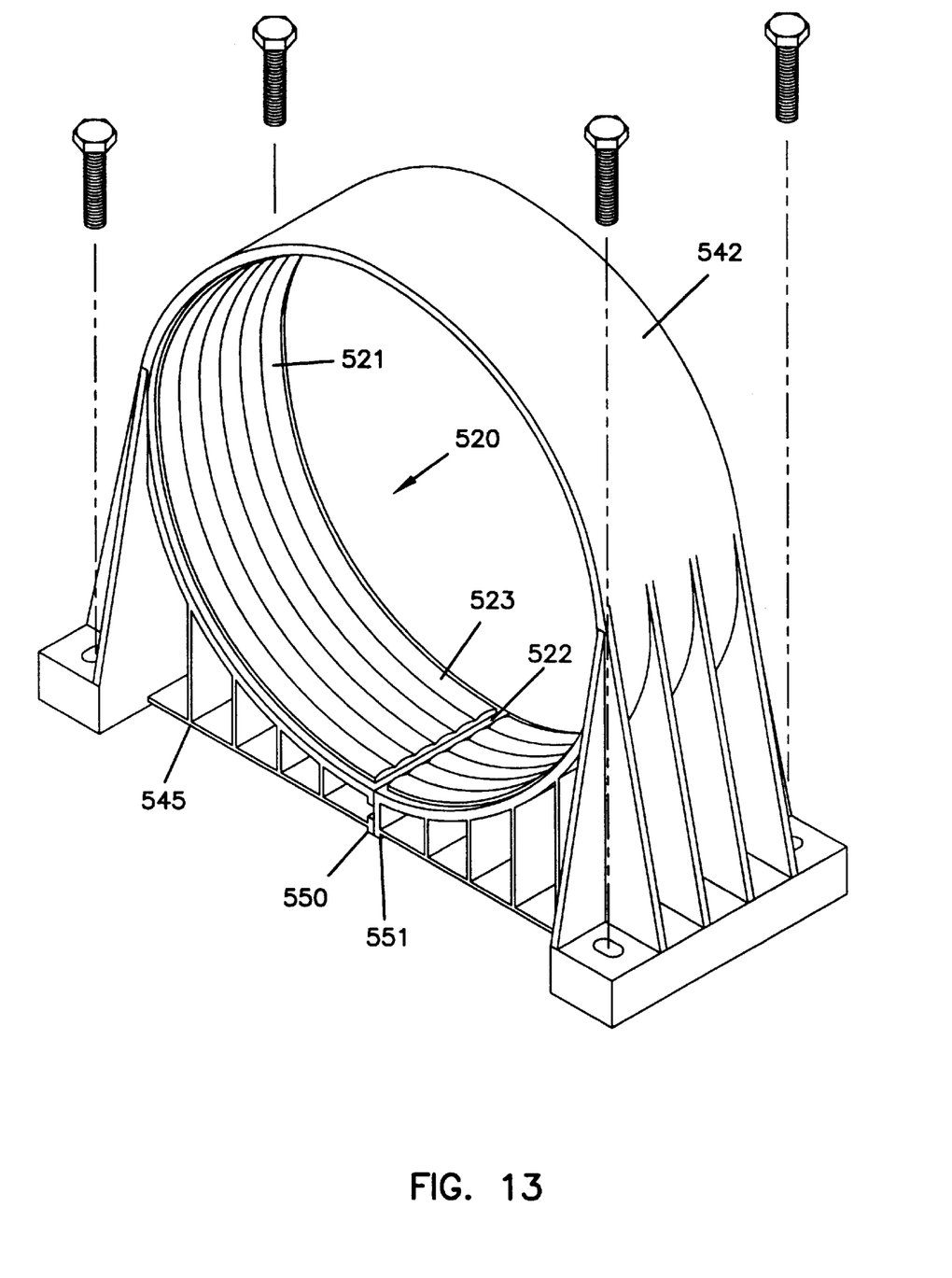
FIG. 13 is a perspective view of a fourth alternate construction according to the present invention.

The arrangement of FIG. 13 is generally analogous to the arrangements illustrated in FIGS. 6 and 9, except it utilizes an alternate configuration for the pad arrangement. In particular, the arrangement of FIG. 13 utilizes a pad arrangement 520 which comprises a single pad 521 having a cross-section with a flat bottom surface 522 and a "wavy" top surface 523. For preferred application in the embodiment of FIG. 13, the wavy upper surface 523 of pad 522 comprises six evenly sized and spaced waves; an upper surface of each being molded to a radius of about 25 mm.

At its thickest, the pad arrangement 520 would be about 3 mm thick and it would be positioned within a 1 mm recess in mounting band 542, so as to project outwardly therefrom, at maximum, 2 mm. A 50–60 shore A Santoprene® would provide for a desirable material. The overall width for the mounting band 542, of a typical preferred construction, would be about 90 mm, with the overall width of the mounting band 542 being about 100 mm.

The FIG. 13 embodiment illustrates a mounting arrangement 540 comprising a mounting band 542 and pad arrangement 520. Mounting band 542 includes framework member 545 defining ends 550 and 551, and a transverse opening, in framework 545.

Figure 14:
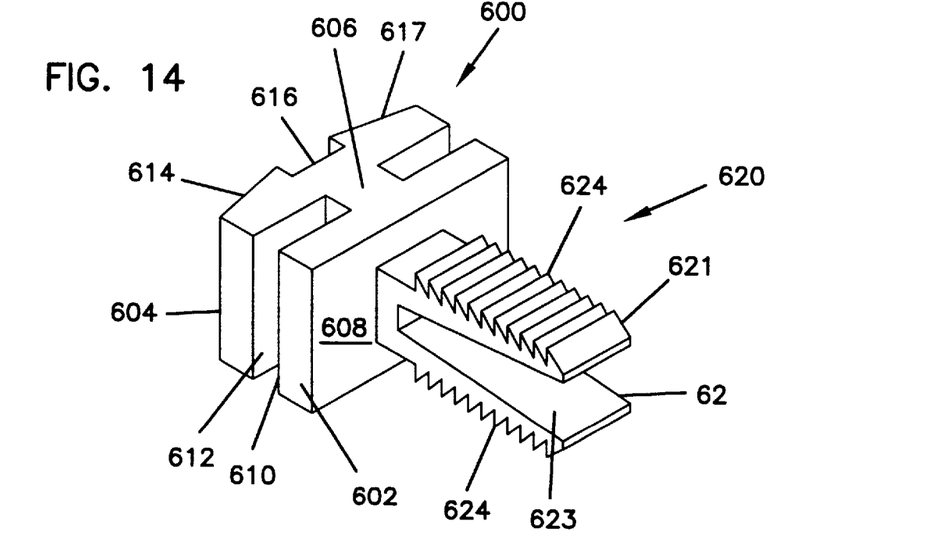
FIG. 14 is a perspective view of a pin construction usable with the FIG. 13 embodiment.

FIG. 14 is a fragmented, enlarged perspective view of a clip arrangement usable with, for example, the mounting band 540 illustrated in FIG. 13. Clip arrangement 600 includes first and second members 602, 604 spaced a distance from each other and joined in a central region by piece 606, such that clip arrangement 600 resembles in top-plan view a modified H shape. First member 602 has a pair of generally flat sides 608, 610, while second member 604 includes one flat side 612 and a curved side 614. Curved side 614 defines a recess 616, and a camming surface 617. A ratchet member 620 is attached to side 608 of first member 602. Ratchet member 620 includes first and second fingers 621, 622 defining a gap 623 therebetween. Each of fingers 621, 622 include a series of teeth 624 along an outer surface.

Figure 15:
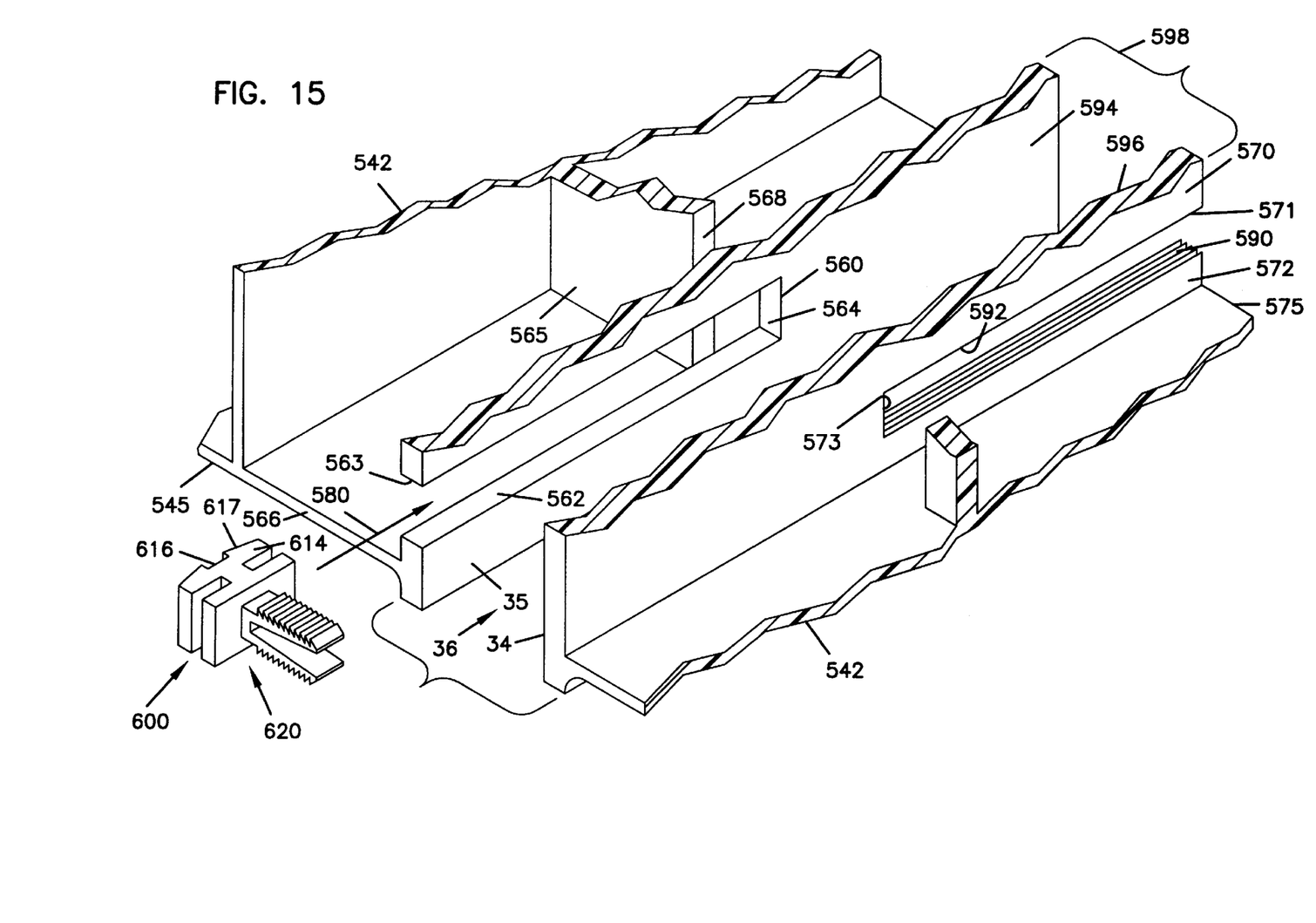
FIG. 15 is a fragmentary, exploded cross-sectional view depicting the pin of FIG. 14 in use, in the embodiment of FIG. 13.

Clip arrangement 600 attaches to mounting band framework across the transverse opening. Specifically, as illustrated in FIG. 15, mounting band 542 defines a first slot 560 in framework 545. Slot 560 is defined by an elongated extension of a wall 562 and a wall 563. Walls 562 and 563 are joined at an end wall portion 564. Therefore, walls 562, 563, and 564 cooperate to form a U-shaped slot 560. Framework 545 includes an upright wall member 565 spaced from a first surface 566 of framework 545. Upright wall member 565 includes an engagement surface 568 for engaging with recess 616 in clip 600. Framework 545 defines a second slot 570. Second slot 570 is defined by walls 571, 572, and 573. Collectively, walls 571, 572, and 573 define slot 570 as penetrating from an end surface 575 of mounting band 542. End surface 545 is on an opposite side from surface 566. Wall 572 includes a series of grooves 590 running the length of slot 570. Wall 571 defines grooves 592 analogous to grooves 590 and wall 572. Grooves 590, 592 are for mateably engaging with ratchet member 620 in clip 600.

To close gap 36, clip 600 is moved into slot 560 as shown at arrow 580. That is, clip 600 is slid along within walls 562, 563 until camming surface 617 engages upright wall member 568. Camming surface 617 slides along upright wall member 568 until upright wall member 568 snaps into place in recess 616. The mounting band 542 is then squeezed together to move one side of the arrangement 594 toward a second side of the arrangement 596 as shown by bracket 598. As second side 596 is moved toward first side 594, ratchet member 620 penetrates slot 570. The teeth 624 on ratchet member 620 engage the grooves 590, 592 and hold the first and second sides 594, 596 together.

While clip arrangement 600 is illustrated as being usable with the FIG. 13 embodiment, it should be understood that it may be usable with all of the arrangements.

Figure 16:
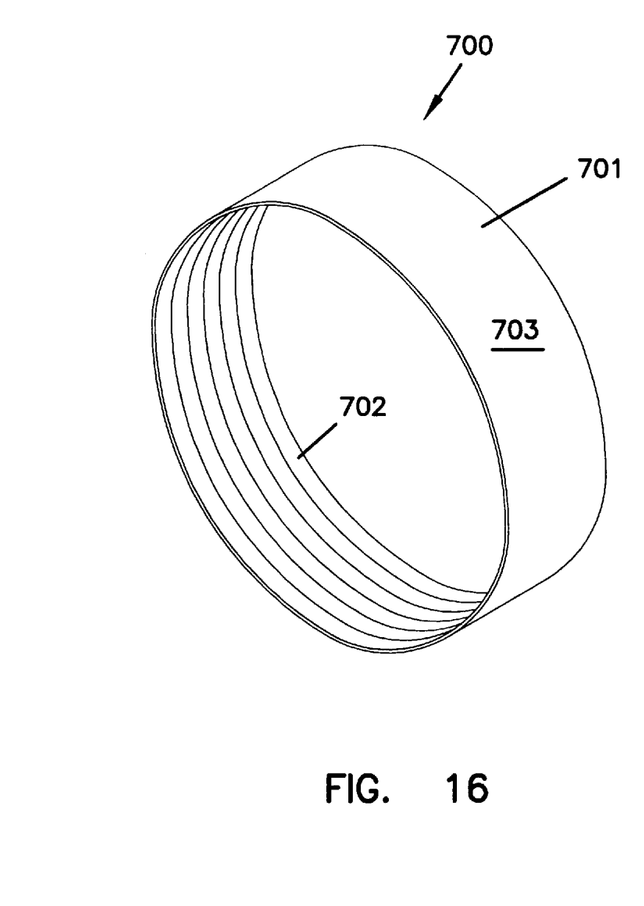
FIG. 16 is a continuous pad usable in a fifth alternate embodiment.
Figure 17:
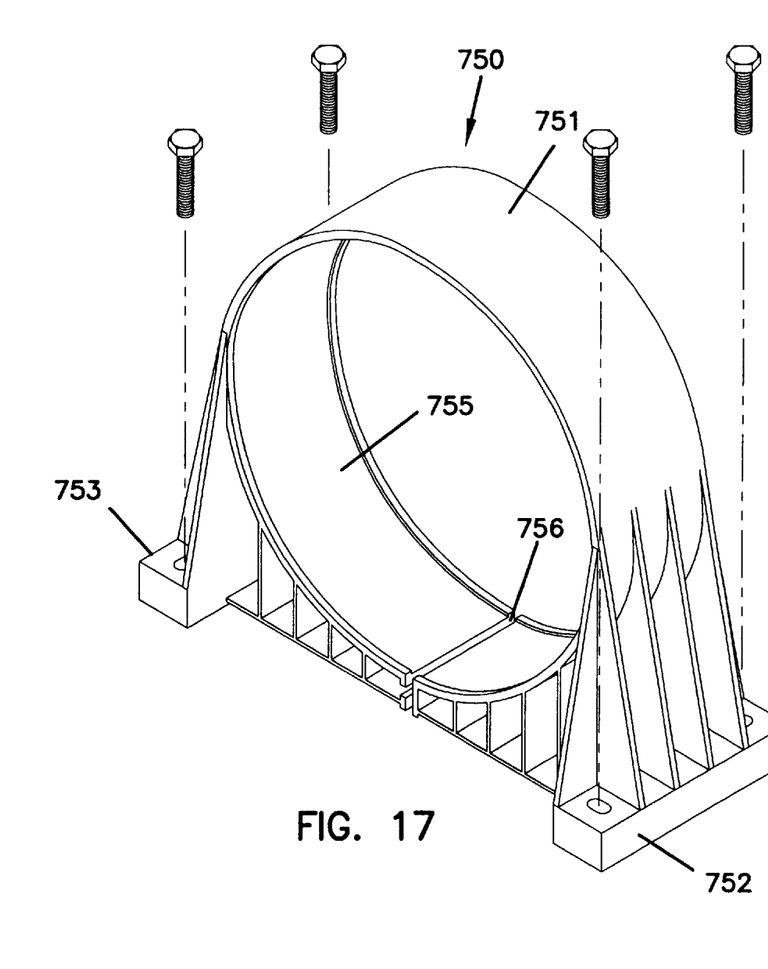
FIG. 17 is a framework construction usable with the fifth alternate embodiment.

Attention is now directed to the arrangement shown in FIGS. 16 and 17. In this embodiment, a continuous, arcuate pad is used for the pad arrangement. This continuous, arcuate, circular, pad is positioned over and around an air cleaner housing, independently of the rigid framework construction in the mounting band. The mounting bad is then positioned circumferentially around the pad arrangement, in use.

Referring to FIG. 16, a pad arrangement 700 is depicted. The pad arrangement comprises a continuous band 701 having an interior wavy surface 702 and an exterior surface 703. The wavy surface 702 for the arrangement shown, comprises six waves, each having a radius of about 25 mm. The continuous arrangement 700 preferably has a thickness, at its thickest location, of about 6 mm. Back side 703 is preferably flat, although it may include some features for engagement with a ridge and framework structure, as described below.

Referring to FIG. 17, rigid framework structure 750 is depicted. Structure 750 includes band 751 and first and second opposite support structures 752 and 753. Note the inner surface 755 of band 751, with its centrally positioned recess 756. Recess 756 is preferably about 90 mm wide, with the overall transverse width of band 751 being about 100 mm.

In use, band 700 would be stretched over an air cleaner assembly, independently of framework member 750. Framework assembly 750 would then be positioned over band 700, and clamped therearound, to secure the air cleaner assembly in place. Thus, when the arrangement of FIGS. 16 and 17 is assembled, it appears as shown in FIG. 1. It is noted that a similar clip arrangement as described in connection with FIGS. 14 and 15 can be used to secure the arrangement of FIGS. 16 and 17 closed.

In general, when an arrangement such as that described in FIGS. 16 and 17 is used, the pad 700 will be a bit thicker and softer than preferred pads for the arrangement of FIGS. 13. This will provide for greater pad integrity and ability to be manipulated, during assembly. Softness down to about 40 Shore A and up to about 55 Shore A will be preferred, with overall thicknesses of at least about 4 or 5 mm, and preferably 6 mm or more, at the thickest point. In other manners, the construction shown in FIGS. 16 and 17 may be generally analogous to that shown in FIGS. 1–3.

Figure 18:
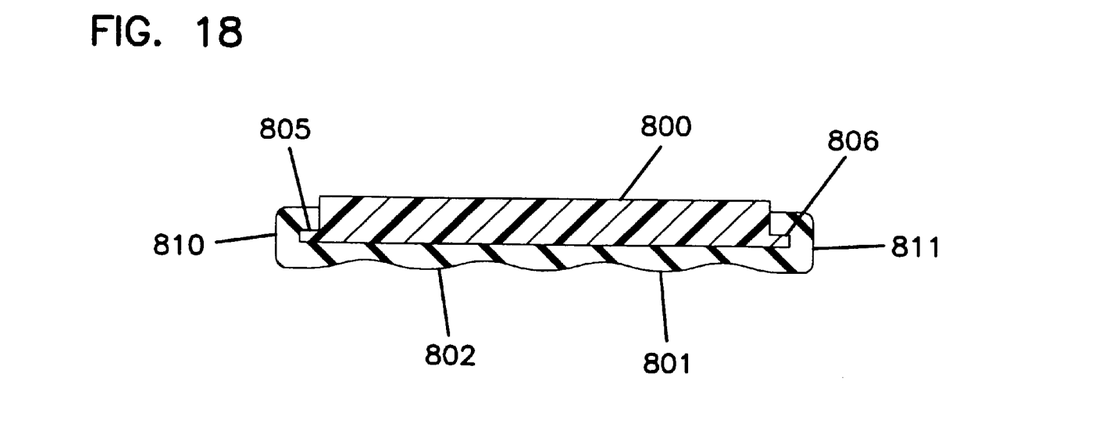
FIG. 18 is a schematic, cross-sectional view of an alternate construction.
Figure 19:
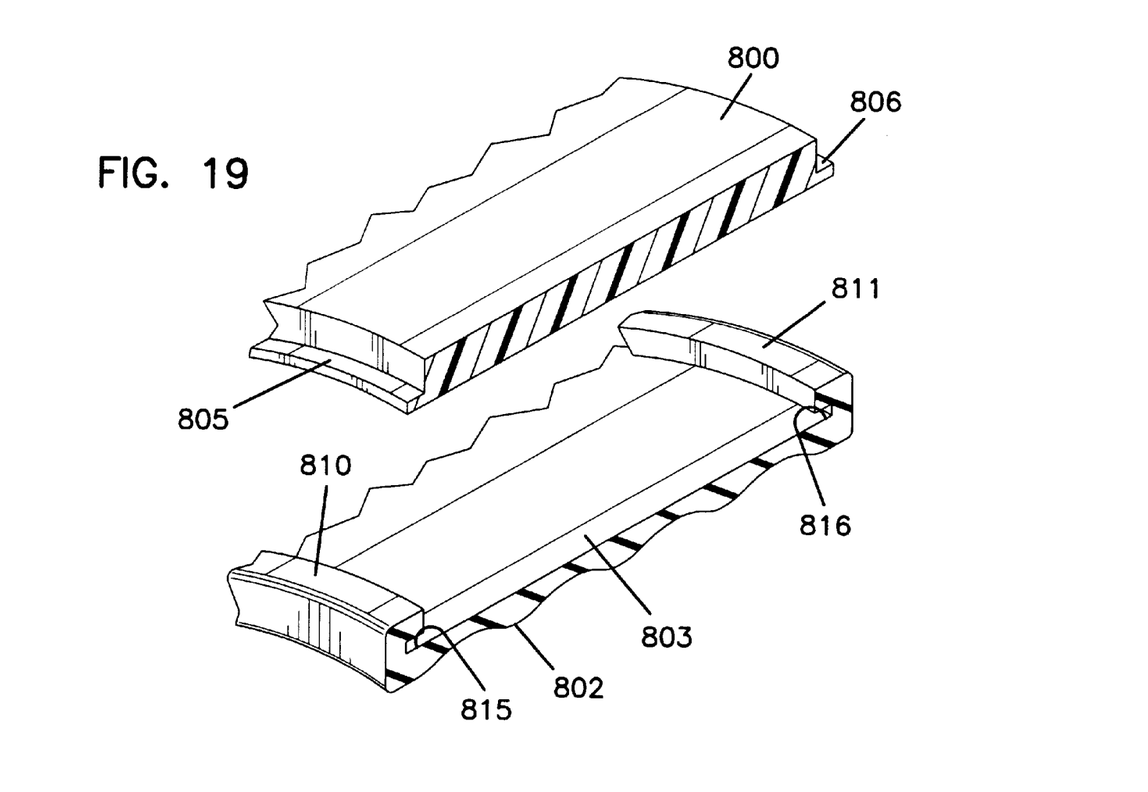
FIG. 19 is an exploded, schematic, cross-sectional view of the embodiment of FIG. 18.

Attention is now directed to the arrangement shown in FIGS. 18 and 19. In this embodiment, a continuous, arcuate pad is used for the pad arrangement. The continuous, arcuate pad is secured in the mounting arrangement through the use of a cooperating engagement arrangement between the pad and a framework of the mounting arrangement.

In reference to FIG. 18, a cross-sectional view of a mounting band 800 and pad arrangement 801 is depicted. The pad arrangement 801 comprises a continuous band having an interior wavy surface 802 and an exterior surface 803. The wavy surface 802 for the arrangement shown comprises four waves and has a thickness at its thickest location of about 4 mm. Exterior surface 803 is preferably flat for engagement with the band 800.

The pad arrangement 801 and band 800 include engagement structure for securing the pad arrangement 801 to the band 800. In the illustrated embodiment, the band 800 defines a pair of shelves or ridges 805, 806 along opposite perimeters of the band 800. The pad arrangement 800 defines structure for mating with the shelves 805, 806. In the example illustrated, the pad arrangement 800 includes a pair of C-shaped grippers 810, 811. As shown in FIG. 18, the C-shaped grippers 810, 811 each define a slot 815, 816 for receiving the shelves 805, 806, respectively.

FIG. 19 illustrates the FIG. 18 embodiment in an exploded view. The slots 815, 816 defined by the C-shaped grippers 810, 811, respectively, are viewable. In use, the band 800 and pad arrangement 801 are analogous to the use of embodiments illustrated in, for example, FIGS. 1–13. Thus, when the arrangement of FIGS. 18 and 19 is assembled, it appears as shown in FIG. 1. It is noted that a similar clip arrangement as described in connection with FIGS. 14 and 15 can be used to secure the arrangement of FIGS. 18 and 19 closed.

The pad arrangement 801 preferably has a softness of about 50–60 Shore A. In other manners, the construction shown in FIGS. 18 and 19 may be generally analogous to that shown in FIGS. 1–3.

A SPECIFIC PREFERRED EMBODIMENT

It will be understood that a wide variety of specific configurations and applications are feasible, using techniques described herein. In this section, a particular arrangement usable for mounting a particular size and style of air cleaner, will be described.

The arrangement described would be particularly configured for mounting a Donaldson FRG air cleaner, to a vehicle such as a truck. A Donaldson FRG air cleaner generally has the following features: with an air filter element installed, it weighs about 10–15 kilograms and will gain about 5–10 kilograms in use; the housing is circular in cross-section and has an outside diameter of about 25–40 cm. The housing sidewall generally comprises steel (1.25 mm). The air cleaner is generally used to filter intake air for the engine of a truck, and operates with a typical airflow rate of about 6 to 75 $m^3$/min, therethrough.

In typical use, the air cleaner would be mounted such that a central longitudinal axis of the cylindrical sidewall extends in a horizontal direction, when positioned on the truck and when the truck is positioned on a level surface.

The framework would be a single molded piece, molded from a 30% glass filled polypropylene, such as Hostacom®, available from Hoechst; alternatively, it may be Latene AG3 UVH G/30 available from Lati. Thus it would be relatively hard, i.e., 110 N/$mm^2$ (ball indentation hardness, 30 sec. value). The base and gussets are configured as illustrated in FIG. 1, and are molded to be about 2.5 mm thick. The gussets are spaced about 30–35 mm apart. A longest support edge 500, FIG. 2, of each gusset 57, 58 would be about 205 mm long. The base edge 501 of each gusset 57, 58 would be about 44 mm long.

The mounting band 30 would be about 3 mm thick where the pads are not located, and about 2 mm thick in the slots. The band would be molded to a circular configuration and would be about 422 mm wide, from the outermost edge of the framework, across the diameter, to the other outermost edge of the framework. The width (transversely) would be about 100 mm for the circular band part itself and 170 mm from the outermost edge of the framework to the opposite outermost edge. Of course, appropriate adjustments to these dimensions may be made for other arrangements, depending upon the application.

The distance between the centers of mounting slots 59 and 61 may be about 131 mm. The distance between the centers of mounting slots 61 and 64 may be about 380 mm.

The pad would comprise a molded pad about 3 mm thick at the thickest portion, of thermoplastic elastomer, molded to a hardness, shore A, of about 50 to 60. Again, appropriate adjustments to these dimensions may be made for other arrangements, depending upon the application.

We claim:

1. A mounting arrangement for an air cleaner assembly; said mounting arrangement comprising:
   (a) a framework construction comprising an arcuate band having an inner surface and first and second ends; said framework construction including:
      (i) a first support arrangement constructed and arranged to support said first end of said arcuate band; said first support arrangement comprising a base and spaced support gussets;
      (ii) a second support arrangement constructed and arranged to support said second end of said arcuate band; said second support arrangement comprising a base and spaced support gussets;
      (iii) said framework construction comprising a unitary, molded, plastic construction;
   (b) a compressible pad arrangement positioned on said arcuate band inner surface; said compressible pad arrangement comprising a plurality of pads;
      (i) each pad being secured to said framework construction by co-molding;
      (ii) each pad having a hardness, shore A, within a range of 40 to 60;
      (iii) each pad being at least 3 mm thick and projecting from said framework inner surface by at least 1 mm;
      (iv) each pad extending at least 70% transversely across said band inner surface.

2. A mounting arrangement according to claim 1 wherein:
   (a) said pad is at least 4 mm thick.

3. A combination comprising:
   (a) an air cleaner having a housing with an outer wall; and
   (b) a mounting arrangement comprising:
      (i) a framework construction comprising an arcuate band having an inner surface and first and second ends; said framework construction including:
         (A) a first support arrangement constructed and arranged to support said first end of said arcuate band;
         (B) a second support arrangement constructed and arranged to support said second end of said arcuate band;
         (C) said framwork construction comprising a unitary, molded, plastic construction;
      (ii) a compressible pad arrangment positioned between said arcuate band inner surface and said air cleaner; said compressible pad arrangement comprising a plurality of pads;
         (A) each pad extending at least 70% transversely across said band inner surface;
         (B) said air cleaner being positioned with said mounting arrangement circumscribing said outer wall, with said compressible pad arrangement securely pressed against said air cleaner outer wall.

4. A combination according to claim 3 wherein:
   (a) said air cleaner housing outer wall metal and has an outside diameter of at least 25 cm;
      (i) said air cleaner, with a filter element therein, weighing at least 10 kilograms;
   (b) said first support arrangement comprises a base and first and second, spaced support gussets;
   (c) said second support arrangement comprises a base and first and second, spaced support gussets;
   (d) said arcuate band extends over an arc of 320° to 360°, when said framework construction is at rest.

5. A combination according to claim 3 wherein:
   (a) each pad has a hardness, shore A, within a range of 40 to 60; and
   (b) each pad is at least 3 mm thick and projects from said framework inner surface by at least 1 mm.

6. A method of mounting an air cleaner comprising:
   (a) providing an air cleaner having a housing with an outer wall;
   (b) providing an arcutate band with an inner surface, and a plurality of compressible pads positioned on the inner surface;
   (c) positioning the band to extend circumferentially around the outer wall of the air cleaner to press the plurality of compressible pads against the outer wall.

7. A method of mounting an air cleaner according to claim 6 wherein:
   (a) said step of positioning includes positioning the band to extend over an arc of 320° to 360°.

* * * * *